Jan. 16, 1945.　　　R. W. MELBOURNE　　　2,367,597

ROTARY FILE

Filed Sept. 21, 1942

INVENTOR
Robert W. Melbourne.
BY
Karl B. Lutz
ATTORNEY

Patented Jan. 16, 1945

2,367,597

UNITED STATES PATENT OFFICE 2,367,597

ROTARY FILE

Robert W. Melbourne, Adrian, Mich., assignor to Adrian Production Tool Co., Adrian, Mich., a partnership composed of Robert W. Melbourne, William F. Markey, and Emma M. Emery, trustee for James H. Emery Application September 21, 1942, Serial No. 459,159

4 Claims. (Cl. 29—78)

This invention relates to rotary files and provides an improved construction in which the cutting teeth are arranged for efficient cutting and self-cleaning operation.

A particular feature of the invention resides in the lay-out of the cutting teeth, which are disposed at an angle of approximately 30° to the axis of the tool in-so-far as such disposition is possible for different shapes of tool heads. This arrangement permits the teeth to clean themselves of cuttings while the tool is in operation.

Another feature lies in the provision of main and filler teeth all of which start from a flat base provided on the head. This construction maintains a uniform cutting periphery after successive sharpenings and therefore continues to cut evenly and without chatter.

These and further objects and advantages of the invention will become apparent as the description proceeds.

While preferred forms are disclosed herein as illustrative of the invention it should be understood that various changes and modifications may be made without departing from the spirit and scope of the invention as hereinafter set forth and claimer.

Rotary files of the type to which this invention relates are made of hard metal and are used in smoothing off metal surfaces, as for example in cleaning up castings and in removing irregularities from welded joints. In uses of this kind rotary files of prior construction quickly become so clogged with chips and cuttings as to materially reduce their cutting efficiency.

To overcome this difficulty the present invention arranges the cutting teeth at an angle of approximately 30° from the axis of rotation of the tool, and as the result of this angular arrangement the cuttings are pushed laterally along the grooves of the teeth and are discharged from the tool, instead of catching in the grooves and clogging up the file. This angle produces the self-cleaning action and at the same time provides an efficient cutting action.

Figure 1:
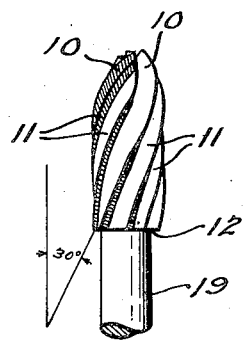
Figure 1 is a side view of a rotary file embodying the invention.
Figure 2:
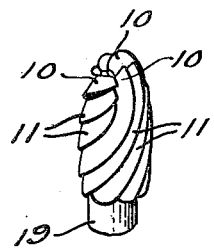
Figure 2 is perspective of the file of Figure 1 with the top tilted slightly forward.

The files are produced with heads of different shapes and the 30° arrangement of the teeth can be adapted to these different shapes. Where the head is of simple cylindrical shape with a rounded tip, as in Figures 1 and 2, the main part of each cutting tooth is disposed at an angle of 30° from the axis. Some of these teeth (3 in the particular size illustrated) constitute main teeth 10 that have their upper ends curved about the rounded upper end to meet at the apex. The teeth between these main teeth constitute filler teeth 11 which stop short of the apex, but have their upper ends curved so as to fill in the space between the main teeth. All of the teeth start from the lower end which constitutes a flat base 12. With this construction the sides of the cylindrical head present a straight cutting edge for smoothing off flat surfaces, the teeth on these sides being all disposed at an angle of 30° to the axis to give a combination of good cutting with self-cleaning action. At the same time the teeth are bent around the apex so as to form a symmetrical and even-cutting whorl for use where a cutting surface of rounded shape is required.

Figure 3:
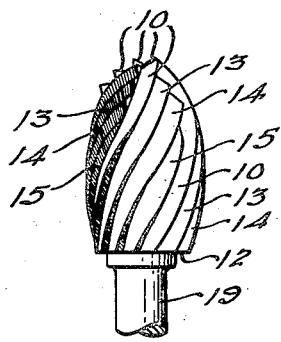
Figures 3 and 4 are views similar to Figures 1 and 2 but illustrating the invention as applied to a file head of another shape.
Figure 4:
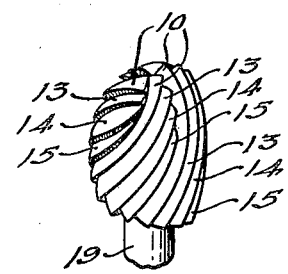

Figures 3 and 4 illustrate a head of slightly larger diameter and of slightly bulbous shape. In this case four main teeth 10 are laid out at an angle of 30° on the sides of the head and have their upper ends curved around so as to meet at the apex. Filler teeth 13, 14 and 15 are laid in between the main teeth and as nearly parallel to the main teeth as possible. It should be noted that the filler teeth become successively shorter, tooth 15 being the shortest, and that the filler teeth, as well as the main teeth, all start from the flat base 12. One advantageous result of this construction is that as the file is re-sharpened after use, the body becomes successively smaller and the short tooth 15 becomes successively shorter until it disappears at the flat base 12. This gradual disappearance of the shorter teeth takes place without disturbing the uniform, symmetrical cutting periphery of the tool, and hence without interfering with its even, non-chattering operation.

Figure 5:
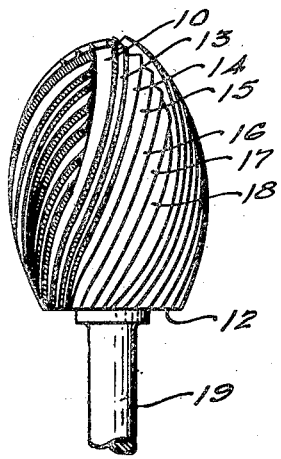
Figures 5 and 6 are views similar to Figures 1 and 2 but showing a still further modification of cutter head.
Figure 6:
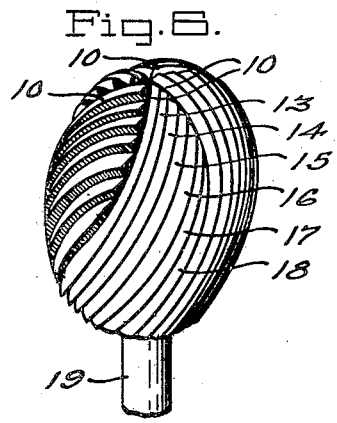

Figures 5 and 6 illustrate a form of head which is still more bulbous in shape, but on which the teeth are laid out according to the principles already explained. In this instance the larger diameter necessitates the use of six filler teeth, designated 13, 14, 15, 16, 17 and 18, between each pair of main teeth 10, there being five of the latter.

While arrangement of the teeth at the 30° angle as described is preferred for most uses, some variation is permissible to adapt the rotary file to particular uses or to cut particular materials, and hence in the appended claims the phase "substantially 30°" should be understood as covering approximately the range from 25° to 35°.

In the bulbous forms of Figures 3 to 6 it is to be noted that the head has a relatively large flat base 12, to which the operating stem 19 is attached. The use of a large base 12 eliminates what would otherwise be a sharply rounded lower part of the side wall which would be of little use in cutting operations. This construction therefore results in economy of material, since it provides maximum usable cutting surface while preserving the desired curved side wall.

The features described above combine to form a fast-cutting and economical rotary file.

I claim:

1. A rotary file comprising a body adapted for rotation about a longitudinal axis, a plurality of cutting teeth on the body, the teeth being disposed on a substantially 30° right hand helical angle to said axis.

2. A rotary file comprising a body adapted for rotation about a longitudinal axis, and having an apex on said axis, a plurality of cutting teeth including main teeth and filler teeth formed on the body, the main portion of all the teeth being disposed on a substantially 30° right hand helical angle to said axis, the main teeth meeting each other at the said apex, and the filler teeth being shorter than the main teeth and terminating in a flute adjacent a main tooth, each main tooth and associated filler teeth forming a pattern, all of the patterns being similar with teeth arranged in the same direction and at the same angle.

3. A rotary file comprising a bulbous body adapted for rotation about a longitudinal axis and having an apex on said axis, a plurality of cutting teeth including main teeth and filler teeth formed on the body, the portion of each tooth along the side of the body being disposed on a substantially 30° right hand helical angle to said axis, the main teeth meeting each other at said apex, and the filler teeth being shorter than the main teeth and terminating in a flute adjacent a main tooth, each main tooth and associated filler teeth forming a pattern, all of the patterns being similar with teeth arranged in the same direction and at the same angle.

4. A rotary file comprising a bulbous body adapted for rotation about a longitudinal axis and having an apex on said axis, a plurality of cutting teeth including main teeth and filler teeth formed on the body, the portion of each tooth along the side of the body being disposed on a substantially 30° right hand helical angle to said axis, all of the teeth starting at the flat base, the main teeth meeting each other at said apex, and the filler teeth being shorter than the main teeth and terminating in a flute adjacent a main tooth, each main tooth and associated filler teeth forming a pattern, all of the patterns being similar with teeth arranged in the same direction and at the same angle.

ROBERT W. MELBOURNE.